(12) United States Patent
Lyatkher

(10) Patent No.: US 8,461,712 B1
(45) Date of Patent: Jun. 11, 2013

(54) POWER GENERATING SYSTEM

(76) Inventor: Victor Lyatkher, Richmond Hts., OH (US)

( * ) Notice: Subject to any disclaimer, the term of this patent is extended or adjusted under 35 U.S.C. 154(b) by 0 days.

(21) Appl. No.: 13/488,259

(22) Filed: Jun. 4, 2012

(51) Int. Cl.
  *F03B 13/00* (2006.01)
(52) U.S. Cl.
  USPC .......................................................... 290/54
(58) Field of Classification Search
  USPC .................................................... 290/45–55
  See application file for complete search history.

(56) References Cited

U.S. PATENT DOCUMENTS

| | | | | | |
|---|---|---|---|---|---|
| 4,418,880 | A | * | 12/1983 | de Waal | 244/199.1 |
| 4,452,046 | A | * | 6/1984 | Valentin | 60/641.11 |
| 4,935,639 | A | * | 6/1990 | Yeh | 290/55 |
| 6,464,459 | B2 | * | 10/2002 | Illingworth | 415/208.2 |
| 6,518,680 | B2 | * | 2/2003 | McDavid, Jr. | 290/54 |
| 7,154,190 | B2 | * | 12/2006 | Kaploun | 290/43 |
| 7,400,057 | B2 | * | 7/2008 | Sureshan | 290/55 |
| 7,573,148 | B2 | * | 8/2009 | Nica | 290/55 |
| 7,780,151 | B2 | * | 8/2010 | Carroni | 261/79.1 |

* cited by examiner

*Primary Examiner* — Truc Nguyen
(74) *Attorney, Agent, or Firm* — The Law Office of Eric W. Peterson

(57) ABSTRACT

The present disclosure pertains to an electric power generation system having a channeling system, a tower having a base, a top frame, an opening, a vane, a gap, an interior area, and a periphery, and a turbine. The tower allows for the creation of a vortex flow of medium in the interior area of the tower thereby creating a pressure drop in the interior area of the tower and increasing the flow of medium across the turbine.

14 Claims, 7 Drawing Sheets

POWER GENERATING SYSTEM

BACKGROUND

Kinetic energy in flowing medium, such as water and wind, is a known source for power generating systems. Hydroelectric and wind-powered electrical generation systems have been used to generate large quantities of power, including those relying on vortex technology. Current commercial vortex based hydro-electric and wind-powered electrical generation systems have many disadvantages including energy loss and reduced system efficiency. Such loss can result from a reduction in vortex stability inside the tower requiring an increased in tower height in order to increase system efficiency. However, the result of this increase in tower height in actuality reduces overall system efficiency. Energy loss can also result from nonuniform action on the turbines resulting in energy pulsation and vibration requiring the utilization of multipliers.

SUMMARY OF THE INVENTION

The present disclosure pertains to an electric power generation system having a channeling system, a tower having a base, a top frame, an opening, a vane, a gap, an interior area, and a periphery, the tower allowing for the creation of a vortex flow of medium in the interior area of the tower, and a turbine.

In one aspect of the disclosure, the channeling system has an interior channel having an inlet and an outlet. In one aspect of the disclosure, a plurality of interior channels are positioned at different heights within the tower. In one aspect of the disclosure, the outlet is positioned tangential to the vortex flow.

In one aspect of the disclosure, the tower comprises a cylindrical configuration. In one aspect of the disclosure, the vanes are circumferentially positioned around the tower thereby forming the side periphery of the tower. In one aspect of the disclosure, the vane directs medium flowing exterior to the tower to flow from the exterior of the tower through the gap and into the interior area of the tower, thereby allowing for the creation of a vortex flow of medium in the interior area of the tower. In one aspect of the disclosure, the vane is oriented in a manner allowing for the medium to flow substantially tangential to the circular periphery of the tower, thereby creating a circular flow of medium in the interior of the tower. In one aspect of the disclosure, the vane is in the shape of an "L" thereby reducing aerodynamic loss.

In one aspect of the disclosure, the turbine is positioned in the channeling system between a high-pressure water source and a low-pressure water exit. In one aspect of the disclosure, the turbine comprises arrow-shaped vanes and small shadowing.

In one aspect of the disclosure, the vortex flow of medium in the interior area of the tower creates a pressure drop in the interior area of the tower, the pressure drop increasing the flow of medium across the turbine. In one aspect of the disclosure, the vortex flow of medium in the interior area of the tower creates a pressure drop through the channel, the pressure drop increasing the flow of medium across the turbine.

In one aspect of the disclosure, the height of the tower provides for an increase in pressure drop within the interior area of the tower.

In one aspect of the disclosure, the system has a lid.

With those and other objects, advantages and features on the invention that may become hereinafter apparent, the nature of the invention may be more clearly understood by reference to the following detailed description of the invention, the appended claims, and the drawings attached hereto.

BRIEF DESCRIPTION OF THE DRAWINGS

The accompanying drawings, which are incorporated herein and form part of the specification, illustrate various embodiments of the present invention and together with the description, further serve to explain the principles of the invention and to enable a person skilled in the pertinent art to make and use the invention. In the drawings, like reference numbers indicate identical or functionally similar elements. A more complete appreciation of the invention and many of the attendant advantages thereof will be readily obtained as the same becomes better understood by reference to the following detailed description when considered in connection with the accompanying drawings, wherein.

DETAILED DESCRIPTION

In the following detailed description, reference is made to the accompanying drawings which form a part hereof and in which is shown by way of illustration specific embodiments in which the invention may be practiced. These embodiments are described in sufficient detail to enable those skilled in the art to practice the invention, and it is to be understood that other embodiments may be utilized and that structural or logical changes may be made without departing from the scope of the present invention. The following detailed description is, therefore, not to be taken in a limiting sense, and the scope of the present invention is defined by the appended claims.

The present disclosure pertains to an electric power generation system driven by the kinetic energy of a flowing medium, such as liquid or air, to generate electrical power. The electric power generation system can have base 210 a channeling system 100, a tower 200, and a turbine 300. The electric power generation system can be applied to any area that provides for medium flow, for example, bodies of water, such as seas, lakes, reservoirs, rivers, or the like, areas with wind, or the like.

Figure 1A:
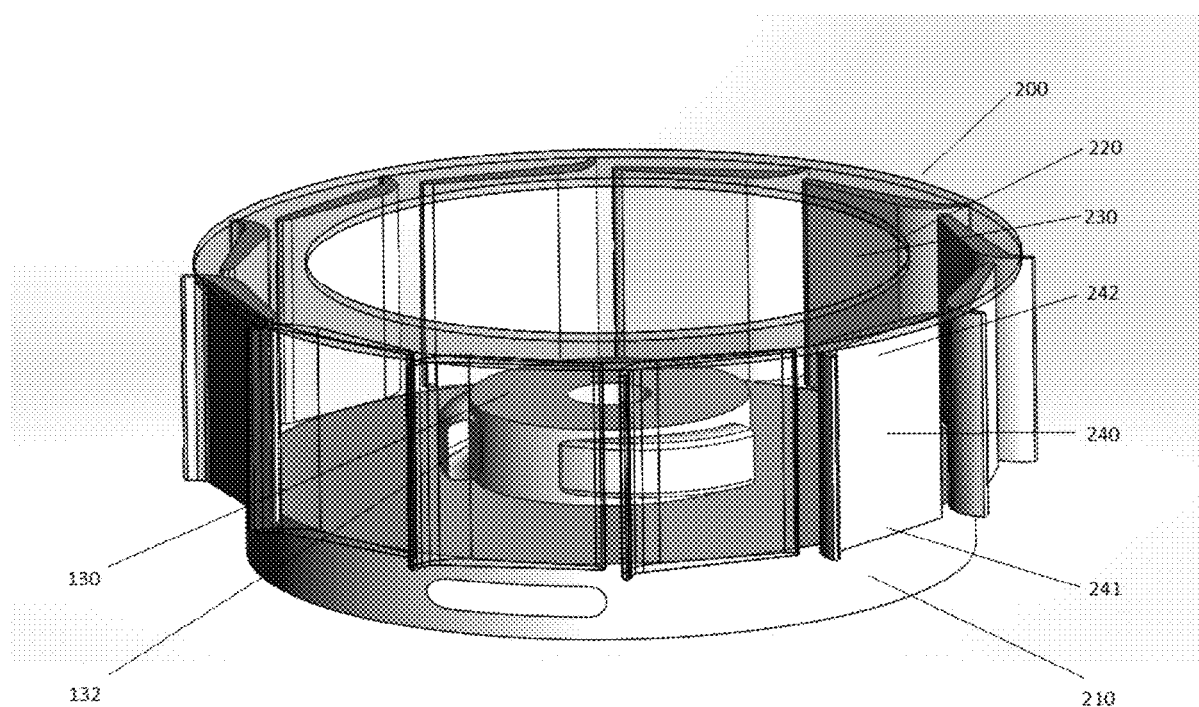
FIG. 1a is a perspective view of a tower according to an exemplary embodiment.
Figure 1B:
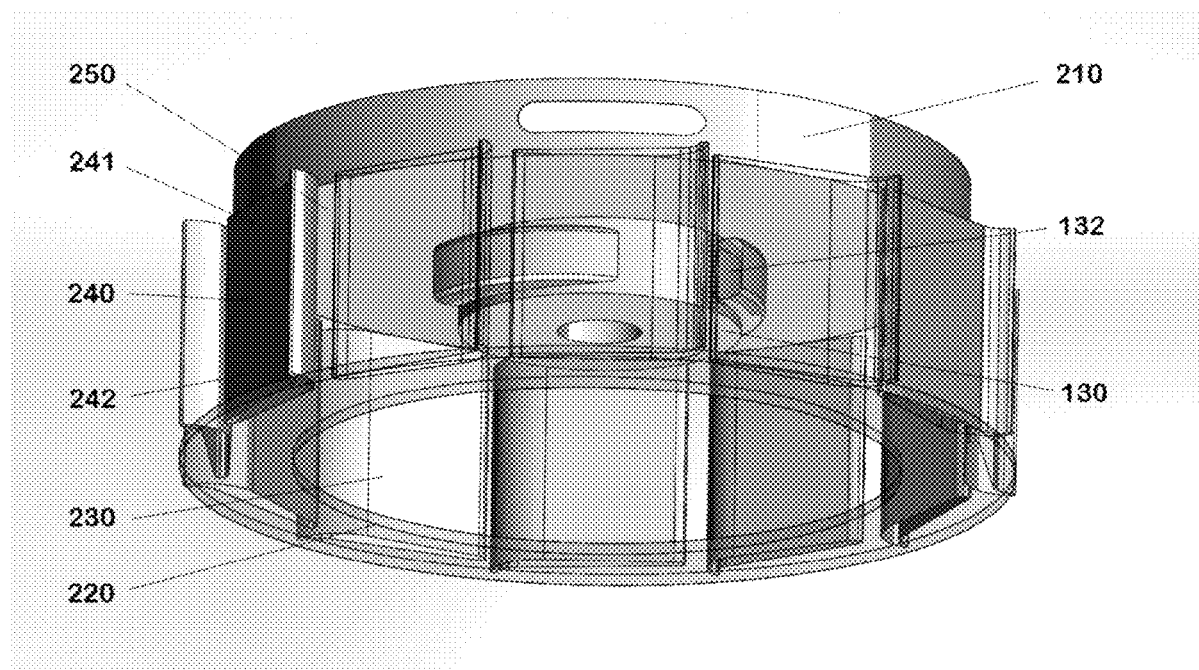
FIG. 1b is a perspective view of a tower according to an exemplary embodiment.

In one embodiment, the channeling system 100 is a plurality of channels or pipes that allow medium to travel from the exterior of the electric power generation system into the interior area 260 of the tower 200. The channeling system 100 can have an exterior channel 120 and at least one interior channel 130. The exterior channel 120 allows for the transfer of medium to the interior channel 130. The exterior channel 120 is positioned exterior to the tower 200. In one embodiment, the exterior channel 120 can have a vertical channel and horizontal channel. As shown in FIGS. 1a & b, the interior channel 130 allows for medium to flow into the interior area 260 of the tower 200. In one embodiment, the interior channel 130 transitions the flow of medium from a vertical directional flow to a horizontal directional flow. The interior channel 130 is preferably positioned in the substantial center of the tower 200. While the size of the interior channel 130 can be any size that allows medium to flow into the interior area 260 of the tower 200, the interior channel 130 preferably has a diameter less than the diameter of the tower 200 and a height less than the height of the tower 200. While the cross-sectional shape of the channeling system 100 can be any shape that allows medium to flow through the channel, the cross-sectional shape is preferably rectangular.

In the preferred embodiment, the interior channel 130 is in the shape of a spiral and has an inlet 131 and outlet 132, where medium passes from the exterior channel 120 to the interior channel 130 through the inlet 131 and medium passes from the interior channel 130 to the interior area 260 of the tower 200 through the outlet 132. Medium flows through the vertical channel, through the horizontal channel, through the interior channel 130, and through the outlet 132.

Figure 2:
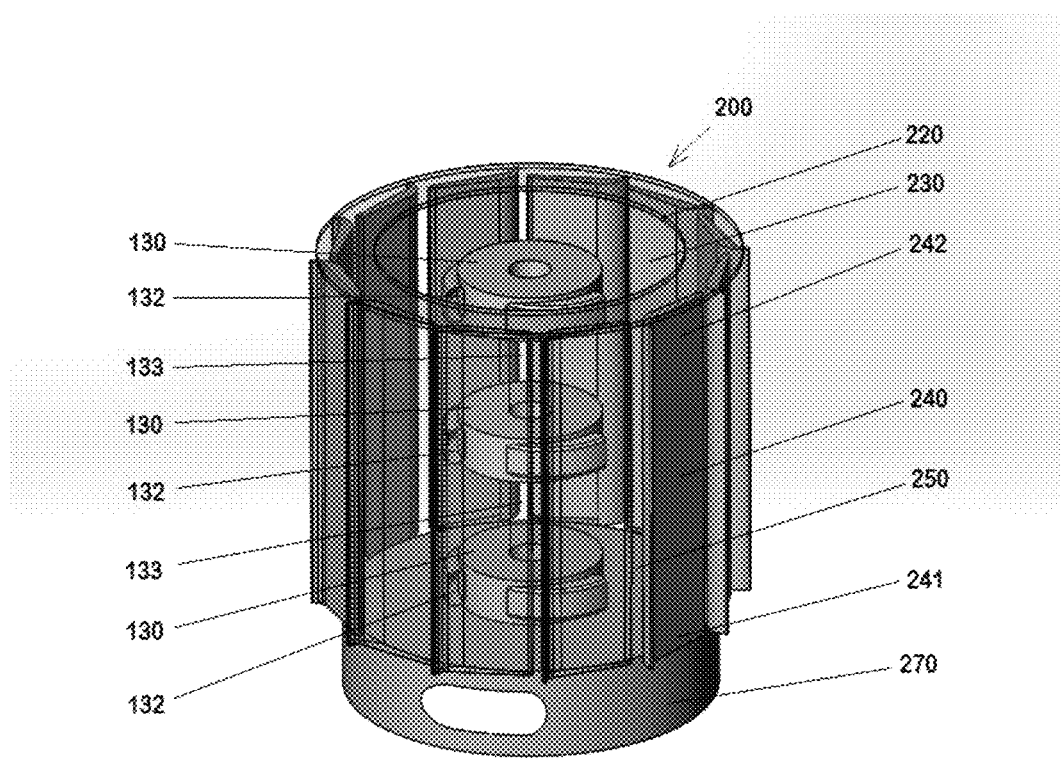
FIG. 2 is a perspective view of a tower according to an exemplary embodiment.

In one embodiment, as shown in FIG. 2, the channeling system 100 has a connecting channel 133 allowing medium to flow from one interior channel 130 to another. For example, where the tower has three interior channels 130, base 210 base 210 a connecting channel 133 engages the first interior channel 130 and the second interior channel 130 thereby allowing medium to flow from the first interior channel 130 to the second interior channel 130, base 210 and a second connecting channel 133 engages the second interior channel 130 and the third interior channel 130 thereby allowing medium to flow from the second interior channel 130 to the third interior channel 130.

The tower 200 can have a cylindrical configuration with a base 210, a top frame 220, an opening 230, vane 240, gap 250, interior area 260, and periphery thereby allowing for the creation of a vortex flow 400 of medium in the interior area 260 of the tower 200. The tower 200 preferably has a plurality of vanes 240 circumferentially positioned around the tower 200 thereby forming the periphery of the tower 200 encompassing an interior area 260. In one embodiment, the vanes 240 can have primary vanes 240 and secondary vanes 240. The vane 240 has a bottom end 241 and a top end 242, where the bottom end 241 of the vane 240 rotationally engages the base 210, and the top end 242 of the vane 240 rotationally engages the top frame 220. The vane 240 rotationally engages the base 210 and top frame 220 in a manner that allows for the vane 240 to rotate around a vertical axis of the vane 240. While the vane 240 can be any shape and size, the vane 240 is preferably in the shape of an "L." When in the shape of an "L" the vane 240 has a first portion and second portion. The "L" shape of the vanes 240 prevents swirls and/or reduced aerodynamic loss. The vanes 240 provide for a plurality of gaps 250 between the vanes 240. The gaps 250 allow for medium to flow from the exterior of the tower 200 to the interior area 260 of the tower 200. The vanes 240 direct medium flowing exterior to the tower 200 to flow from the exterior of the tower 200 through the gaps 250 and into the interior area 260 of the tower 200, thereby allowing for the creation of a vortex flow 400 of medium in the interior area 260 of the tower 200. The opening 230 is an opening in the top frame 220 and allows medium to exit the tower 200 through the opening 230. In one embodiment, the tower 200 is oriented so that the opening 230 is on top of the tower 200 thereby allowing for the vortex flow 400 of medium to flow upward and exit the top of the tower 200. In one embodiment, the tower 200 is oriented so that the opening 230 is on the bottom of the tower 200, thereby allowing for the vortex flow 400 of medium to flow downward and exit the bottom of the tower 200.

In one embodiment, the orientation of the vane 240 is controlled by a drive mechanism located outside the tower 200, where the drive mechanism rotates the vane 240 about a vertical axis. The rotation of the vanes 240 about the vertical axis of the vane 240 increases and decreases the size of the gap 250 between the vanes 240 thereby controlling the amount of medium flowing through the gap 250.

In one embodiment, the vane 240 and top frame 220 can be hollow providing for use as an element of a pneumatic accumulator and/or to increase the buoyancy of the tower 200.

Figure 3A:
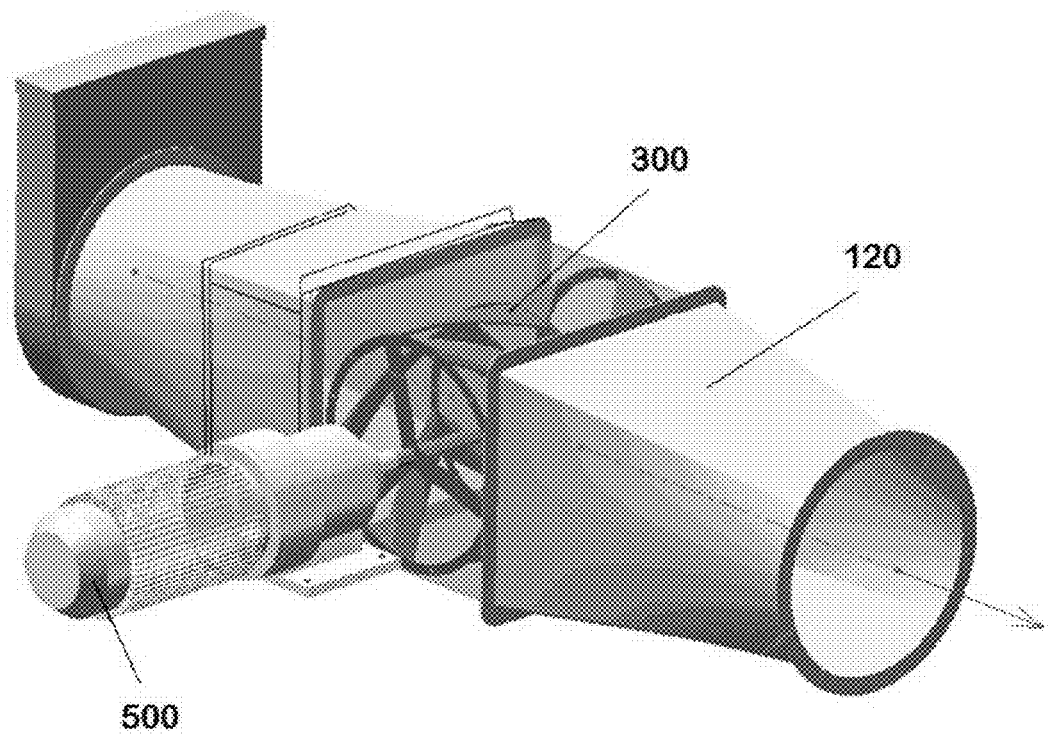
FIG. 3a is a perspective view of a turbine and channels according to an exemplary embodiment.
Figure 3B:
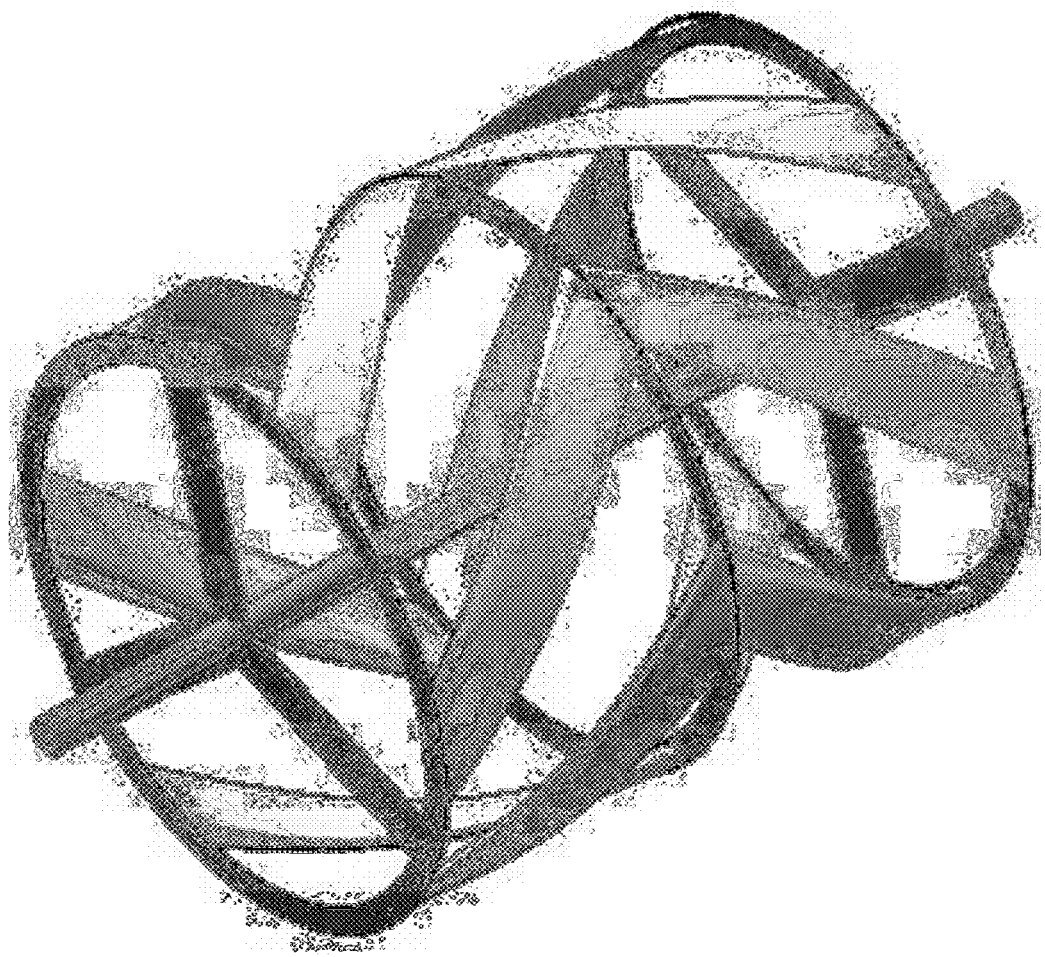
FIG. 3b is a perspective view of a turbine according to an exemplary embodiment.

The turbine 300 allows for energy to be extracted from a medium flow and converted into useful work. At least one turbine 300 is located between a high-pressure water source and a low-pressure water exit. For example, the turbine 300 can be located in-line of the channeling system 100 where the high-pressure water source is the inlet 131 and the lower pressure water exit is the outlet 132. In one embodiment, at least one turbine 300 is located in each at least one interior channel 130. While the turbine 300 can be any turbine 300 that converts energy from fluid flow to useful work, as shown in FIGS. 3a & b, the turbine 300 is preferably a balanced turbine 300 with arrow-shaped vanes 240 and small shadowing as described in U.S. Pat. No. 7,742,729. By way of example, the turbine 300 can also have bent vanes and/or vanes with straight-line segments.

In one embodiment, the electric power generation system can have a generator 500 for converting mechanical energy to electrical energy. The generator 500 is coupled to the turbine 300. While the generator 500 can be any mechanism for converting mechanical energy to electrical energy, the generator 500 is preferably a coaxial generator 500 that allows for rotation speed variations that increases the energy output upon a change in medium flow in the channel.

In one embodiment, the electric power generation system can have a reciprocating compressor for capturing excess energy resulting from medium flow and for maintaining energy output in accordance with a desired schedule.

Figure 4:
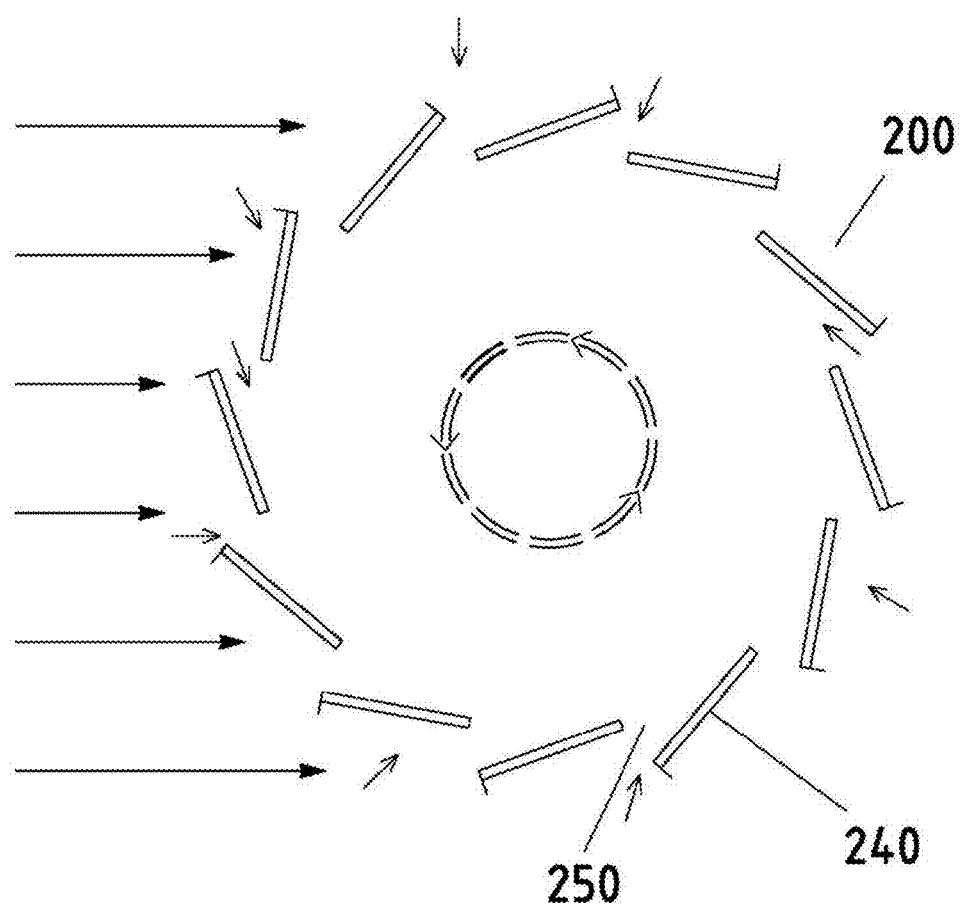
FIG. 4 is a plan view of a tower according to an exemplary embodiment.
Figure 5A:
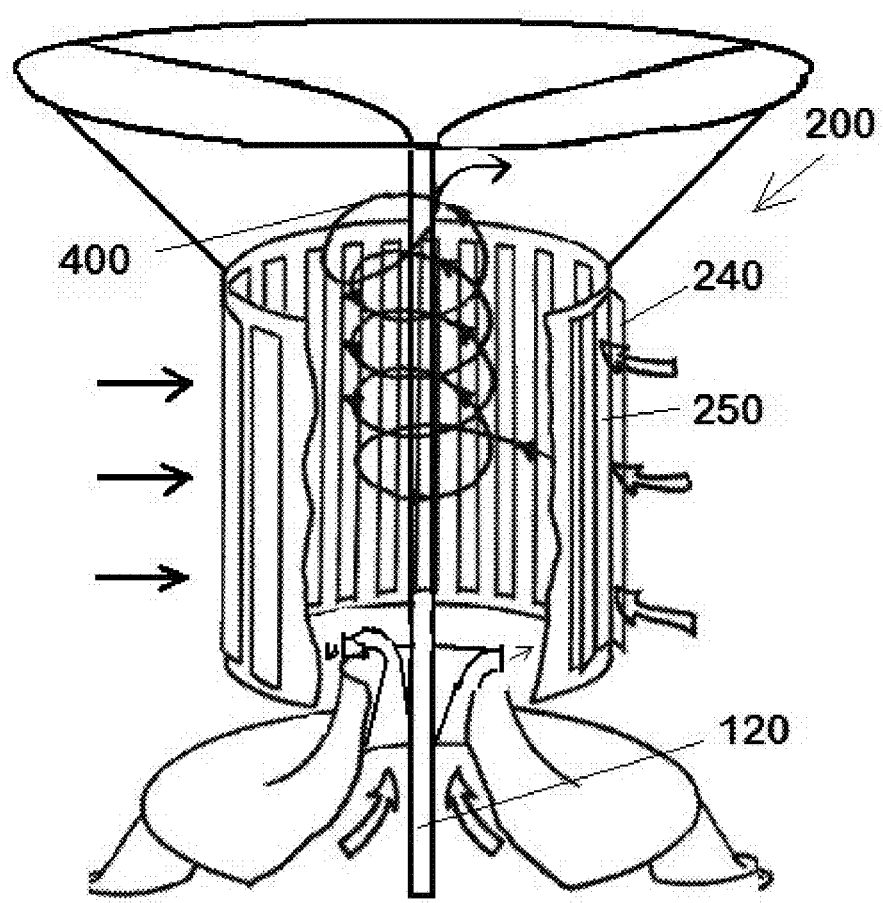
FIG. 5a is a perspective view of a tower according to an exemplary embodiment.
Figure 5B:
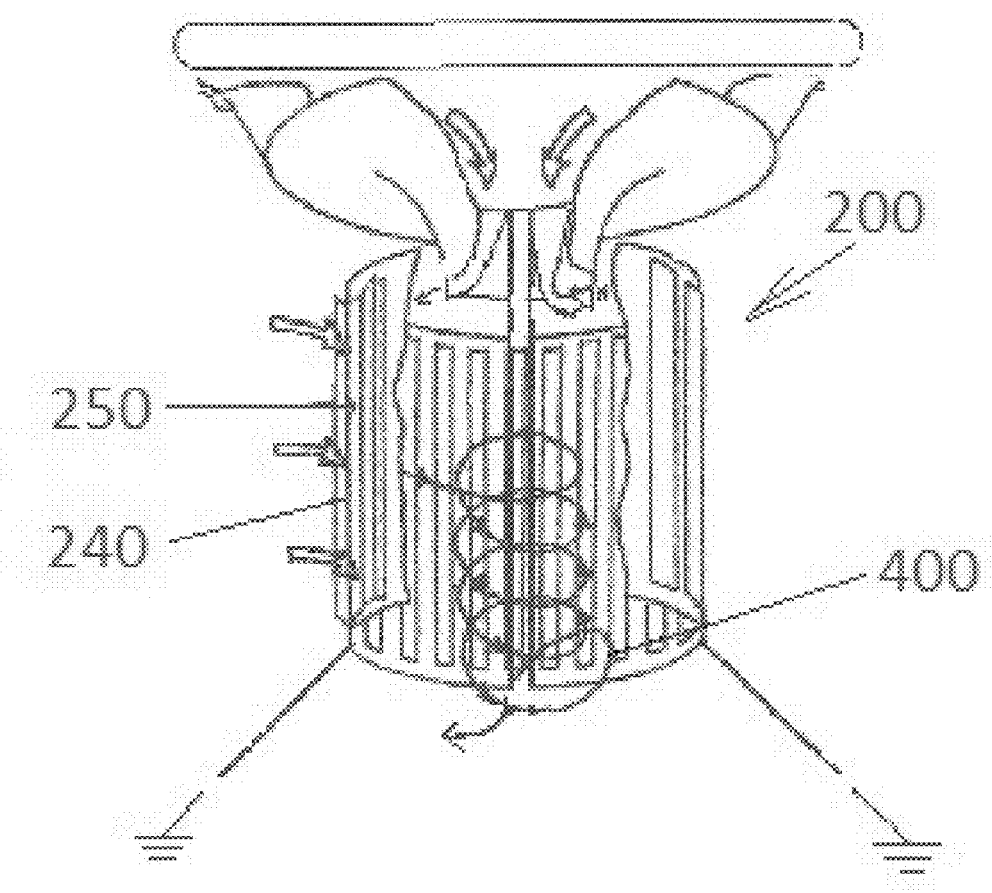
FIG. 5b is a perspective view of a tower according to an exemplary embodiment.

The vanes 240 can be positioned at any orientation that allows for a desired medium flow angle α as the medium enters the tower 200. The orientation of the vanes 240 can be dependent on the direction of medium flow in relation to the tower 200. In one embodiment, the vanes 240 are oriented in a manner that provides for medium to flow through the gaps 250 in a direction that is substantially tangential to the circular periphery of the tower 200, thereby creating a circular flow of medium in the interior area 260 of the tower 200. For example, as shown in FIGS. 4, 5a-b, the primary vanes 240 are oriented so that the primary vanes 240 provide for flowing medium exterior to the tower 200 to flow through gaps 250 adjacent to the primary vanes 240 in a direction substantially tangential to the periphery of the tower 200. This provides for a pressure drop through the gaps 250 adjacent to the secondary vanes 240 causing medium to flow through the gaps 250 adjacent to the secondary vanes 240, thereby creating a circular flow of medium in the interior area 260 of the tower 200. This circular flow of medium creates a vortex flow 400 that creates a pressure drop in the interior area 260 of the tower 200 thereby providing for a pressure drop through the channel system 200. In one embodiment, the pressure drop is in the substantial center of the vortex flow 400. The pressure drop can occur at a plurality of heights of the substantial center of the vortex flow 400. The pressure drop increases the flow of medium through the channel system 400, thereby increasing the flow of medium across the turbine 300. The increase in flow of medium across the turbine 300 results in an increase in power.

In one embodiment, the longitudinal axis of the interior channel 130 at the outlet 132 is positioned tangential to the vortex flow 400, thereby providing for the medium to exit the outlet 132 tangentially to the vortex flow 400. The tangential position of the longitudinal axis in relation to the vortex flow 400 allows for an increase in pressure drop through the channel, thereby increasing the flow of medium across the turbine 300.

In one embodiment, where the channeling system 100 has a plurality of interior channels 130, as shown in FIG. 2, the interior channels 130 are positioned at different heights or tiers within the tower 200 allowing for medium to flow through the output of each interior channel 130 at varying heights of the vortex flow 400. The flow of medium through the output of a plurality of interior channels 130 at varying heights within the tower 200 allows for the creation of a pressure drop within each interior channel 130 thereby increasing the energy production of each turbine 300 within each interior channel 130.

In one embodiment, the height of the tower 200 is reduced in relation to standard height of tower 200 used in electric power generation systems. The reduction of tower 200 height allows for an increase in pressure drop at the substantial center of the vortex flow 400.

In one embodiment, the tower 200 can have a lid (not shown). In one embodiment, the lid provides an increase in pressure drop in the substantial center of the vortex flow 400. In one embodiment, the lid can prevent the medium in the vortex flow 400 from exiting the top of the tower 200. The lid can engage to top frame 220. The lid can be any shape that allows for an increase pressure drop and/or prevents medium in the vortex flow 400 from exiting the top of the tower 200. In one embodiment, the lid is concave or dome-shape. Concave lids have been shown to increase the pressure drop within the channels by nine flow velocity heads. In one embodiment, the lid can be a semi-ellipsoid shape. Semi-ellipsoidal shaped lids can decrease pressure in the substantial center of the tower 200/vortex by 1-2 flow velocity heads.

The foregoing has described the principles, embodiments, and modes of operation of the present invention. However, the invention should not be construed as being limited to the particular embodiments described above, as they should be regarded as being illustrative and not as restrictive. It should be appreciated that variations may be made in those embodiments by those skilled in the art without departing from the scope of the present invention.

Modifications and variations of the present invention are possible in light of the above teachings. It is therefore to be understood that the invention may be practiced otherwise than as specifically described herein.

What is claimed is:

1. An electric power generation system comprising:
   a channeling system having an interior column with a spiral passageway having an inlet and an outlet,
   a tower having a base, a top frame with an opening, a plurality of vanes connected between the base and the top frame creating a periphery and an interior area, and a gap created between the first vane and the second vane, the tower allowing for the creation of a vortex flow of medium in the interior area of the tower, and
   a turbine located in-line of the channeling system, and
   a generator coupled to the turbine.

2. The system of claim 1 wherein a plurality of interior columns are positioned at different heights within the tower.

3. The system of claim 2 wherein the outlet is positioned tangential to the vortex flow.

4. The system of claim 1 wherein the tower comprises a cylindrical configuration.

5. The system of claim 1 wherein the vanes are circumferentially positioned around the tower thereby forming the periphery of the tower.

6. The system of claim 1 wherein the vane directs medium flowing exterior to the tower to flow from the exterior of the tower through the gap and into the interior area of the tower, thereby allowing for the creation of a vortex flow of medium in the interior area of the tower.

7. The system of claim 6 wherein the vane is oriented in a manner allowing for the medium to flow substantially tangential to the circular periphery of the tower, thereby creating a circular flow of medium in the interior of the tower.

8. The system of claim 1 wherein the vane is in the shape of an "L" thereby reducing aerodynamic loss.

9. The system of claim 1 wherein the turbine is positioned in the channeling system between a high-pressure water source and a low-pressure water exit.

10. The system of claim 1 wherein the turbine comprises arrow-shaped vanes and small shadowing.

11. The system of claim 1 wherein the vortex flow of medium in the interior area of the tower creates a pressure drop in the interior area of the tower, the pressure drop increasing the flow of medium across the turbine.

12. The system of claim 1 wherein the vortex flow of medium in the interior area of the tower creates a pressure drop through the interior column, the pressure drop increasing the flow of medium across the turbine.

13. The system of claim 1 wherein the height of the tower provides for an increase in pressure drop within the interior area of the tower.

14. The system of claim 1 further comprising a lid.

* * * * *